F. J. McNULTY.
RAILROAD CAR.
APPLICATION FILED FEB. 12, 1913.
1,084,653.
Patented Jan. 20, 1914.
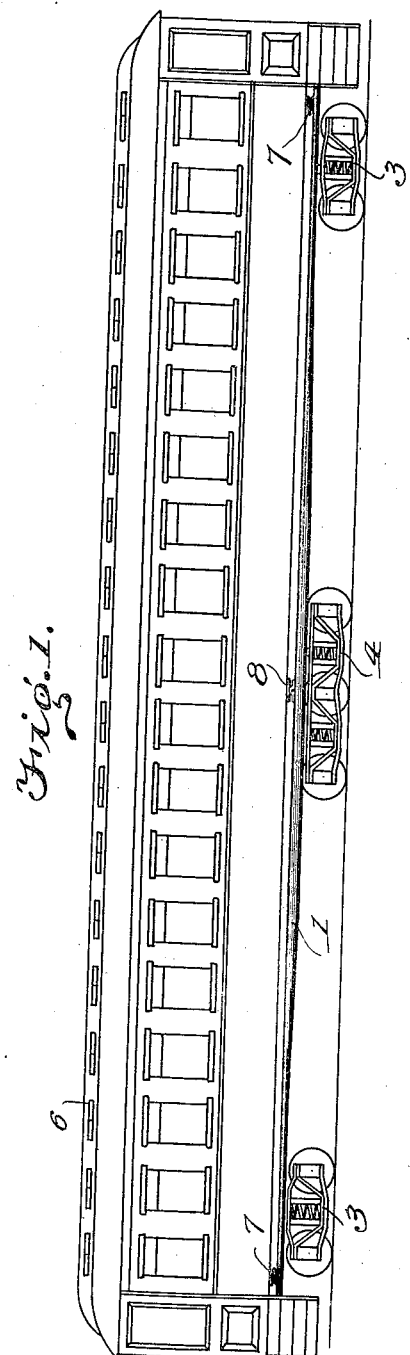
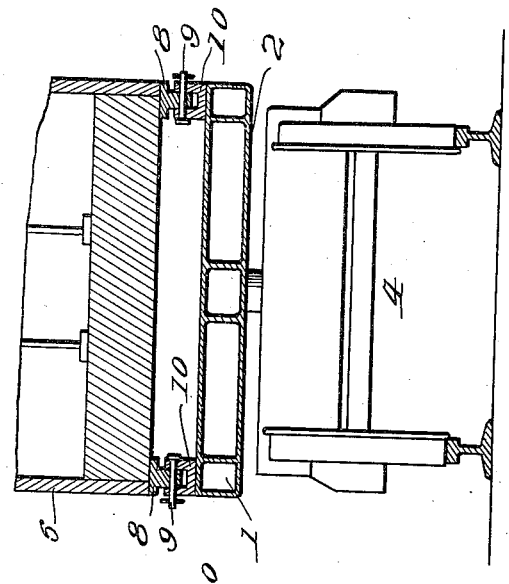
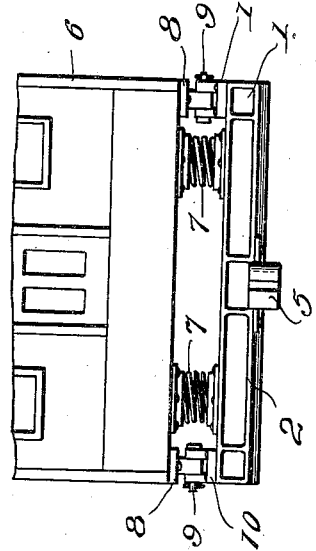
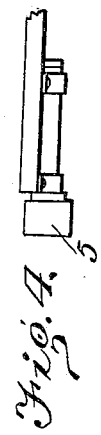
Inventor
F. J. McNulty

UNITED STATES PATENT OFFICE.

FRANK J. McNULTY, OF KANSAS CITY, MISSOURI.

RAILROAD-CAR.

1,084,653.

Specification of Letters Patent.

Patented Jan. 20, 1914.

Application filed February 12, 1913. Serial No. 748,025.

*To all whom it may concern:*

Be it known that I, FRANK J. McNULTY, a citizen of the United States, residing at Kansas City, in the county of Jackson and State of Missouri, have invented certain new and useful Improvements in Railroad-Cars, of which the following is a specification.

This invention has for its object the provision of a railroad car which will maintain its balance, bringing the weight of the car body to a central point of gravity.

A further object is the provision of a car in which the draft will be applied to the truck frame so that endwise pulling strain will be taken from the car body, and a still further object is to provide means at the ends of the car to maintain its balance.

The invention is illustrated in the accompanying drawings and consists in certain novel features which will be hereinafter first fully described and then more particularly pointed out in the claims.

In the drawings: Figure 1 is a side elevation of a railroad car embodying my present invention; Fig. 2 is a detail view of a portion of the end of the car body and the truck frame; Fig. 3 is a detail transverse section taken approximately at the center of the car body and the truck frame. Fig. 4 is a detached detailed elevation of the draw-head.

In carrying out my invention, I employ a truck frame 1 which will preferably consist of longitudinal sills and bars or beams 2 connecting the same. This truck frame is supported upon trucks 3 at its ends and an intermediate truck 4 at its center which may be of any well known type and will be connected to the truck frame by king bolts in the ordinary manner. In the drawing, I have shown a six-wheel truck at the center of the frame and four-wheel trucks at the ends thereof, but it is to be understood that this particular arrangement is immaterial and the trucks may all be of the same design if preferred. The car couplings or draw bars 5 are secured to the ends of the truck frame so that the draft will be applied directly to the truck frame and the car body 6 supported on the truck frame will, consequently, be relieved of endwise strain and will not be thrown out of balance. The car body may be of the general type now in common use and is supported upon the truck frame at the ends thereof through the intervention of springs 7 which are suitably fitted to the top of the truck frame and the bottom of the car body, as will be readily understood. The car body is connected to the truck frame at the transverse center thereof by brackets or bearing clips 8 which are secured rigidly to the beam of the car body and engage pivot pins or rods 9 inserted through similar brackets 10 secured on the truck frame.

From the foregoing description, taken in connection with the accompanying drawings, it will be seen that I have provided a car body which is connected to the truck frame only at the center and, consequently, will remain perfectly balanced under all the varying conditions of travel. The springs at the ends of the truck frame and the car body will absorb all shocks from irregularities or rough joints in the track and will preserve the even balance of the car so that the comfort of the passengers will be promoted.

By having the truck frame and the car body constructed independently of each other the cost of maintenance will be reduced, inasmuch as accident or damage to the car body will not require the provision of a new truck frame and damage or injury to the truck frame will not require the provision of a new car body, and, should either be damaged so as to be rendered temporarily or permanently useless, the other may still be used, as will be readily understood. It will also be noted that as the car body is secured to the truck frame by a horizontally disposed hinge or pivotal connection endwise oscillation of the body is effectually prevented and the pivotal connection of the trucks to the truck frame will permit the truck frame and the car body to easily pass around sharp curves.

What I claim is:—

1. The combination with a car body, of a truck frame extending under the car body the full length thereof, a transverse, horizontal pivotal connection between the car body and the truck frame on the transverse medial line thereof, and yieldable supports between the ends of the truck frame and the ends of the car body.

2. The combination of a truck frame, trucks supporting the same, draft devices secured to the ends of the truck frame, a car body mounted over the truck frame and pivotally secured thereto on the medial transverse line thereof, and yieldable supports between the ends of the truck frame and the ends of the car body.

3. The combination of a truck frame, a truck pivotally connected therewith at the middle thereof, other trucks pivotally connected with the truck frame near the ends thereof, transverse journal rods mounted on the truck frame on the transverse medial line of the same, a car body, depending brackets secured to the bottom of the car body and fitting around said journal rods, and springs interposed between the ends of the car body and the ends of the truck frame.

4. The combination of a truck frame, trucks supporting the same, a car body disposed over the truck frame, and a transverse horizontally disposed hinge connection between the car body and the truck frame on the transverse medial line thereof.

In testimony whereof I affix my signature in presence of two witnesses.

FRANK J. McNULTY. [L. S.]

Witnesses:
CHAS. D. LISIECKI,
ALFRED C. MALL.